United States Patent
Lee et al.

(10) Patent No.: US 6,785,737 B2
(45) Date of Patent: Aug. 31, 2004

(54) NETWORK RESOURCE ALLOCATION METHODS AND SYSTEMS

(75) Inventors: Byoung-Joon Lee, Nepean (CA); Hans Frederick Johnsen, Kanata (CA); Richard Charles Vieregge, Nepean (CA)

(73) Assignee: Tropic Networks Inc., Kanata (CA)

( * ) Notice: Subject to any disclaimer, the term of this patent is extended or adjusted under 35 U.S.C. 154(b) by 499 days.

(21) Appl. No.: 09/917,669

(22) Filed: Jul. 31, 2001

(65) Prior Publication Data

US 2003/0028670 A1 Feb. 6, 2003

(51) Int. Cl.⁷ ............................................. G06F 15/173
(52) U.S. Cl. ..................... 709/241; 370/230.1; 370/401
(58) Field of Search ............................... 709/238–245, 709/223–229; 370/230.1, 401

(56) References Cited

U.S. PATENT DOCUMENTS 6,647,428 B1 * 11/2003 Bannai et al. ............... 709/245
6,661,775 B1 * 12/2003 Nakayama et al. ...... 370/230.1
6,680,948 B1 * 1/2004 Majd et al. .................. 370/401

OTHER PUBLICATIONS

"Requirements for Traffic Engineering Over MPLS", Awduche, et al., RFC 2702, Sep. 1999, pp. 1 to 29.
"Requirements for support of Diff–Serv–aware MPLS Traffic Engineering", Francois Le Faucheur, et al., IETF Internet Draft, Jan., 2001, pp. 1 to 9.
"Assured Forwarding PHB Group", Heinanen, RFC 2597, Jun. 1999, pp. 1 to 11.
"An Expedited Forwarding PHB", Jacobson, et al., RFC 2598, Jun. 1999, pp. 1 to 11.
"The n–Dimensional Superswitch", Josh McHugh, Wired May 2001.

* cited by examiner

*Primary Examiner*—St. John Courtenay, III
(74) *Attorney, Agent, or Firm*—Victoria Donnelly

(57) ABSTRACT

Methods and components are provided which ensure both the improved use of network resources and adequate performance of best effort (BE) traffic by intelligently distributing the BE traffic demands at connection level with corresponding scaling weights, and without reserving bandwidth. A weighted sum of the best effort (BE) class connections (or LSPs in MPLS context) in a link is used as a path selection criterion, where each BE connection is weighted by its service volume. Path selection for a requested BE service volume is performed by creating a virtual topology in which all links in a network have weighted BE metrics updated to include the effects of the requested BE service volume, and identifying a best path through the virtual topology taking into account the weighted BE metrics.

15 Claims, 3 Drawing Sheets

NETWORK RESOURCE ALLOCATION METHODS AND SYSTEMS

FIELD OF THE INVENTION

The invention relates to network resource allocation methods and systems, and more particularly to methods and systems of allocating resources to low priority traffic, such as best effort traffic.

BACKGROUND OF THE INVENTION

In current IP (Internet Protocol) networks, packet forwarding is based on connectionless and destination-based SPF (Shortest Path First) routing mechanisms and also in the best effort manner. As a result of this, some links can be heavily utilized and congested while others remain idle, resulting in non-optimal use of network wide resources and poor packet performance. As a remedy to this problem, the explicit routing capability of MPLS (Multi Protocol Label Switching) is being employed to redirect traffic toward under-utilized parts of the network [1, 2]. Such a practice is generally termed "traffic engineering."

Different levels of QoS (Quality of Service) can also be supported by MPLS explicit LSP (Label Switched Path) setup coupled with constraint based routing protocols (e.g., OSPF-TE (Open Shortest Path First—Traffic Engineering) or ISIS-TE (Intermediate System to Intermediate System Routing exchange Protocol—Traffic Engineering). In such mechanisms, the bandwidth for a certain service class is explicitly reserved along the path, and the link usage information is updated for CAC (Connection Admission Control) purpose. However, in general, BE (Best Effort) class traffic is not associated with any bandwidth reservation, i.e., CIR (Committed Information Rate)=0, hence no performance guarantee.

ECMP (Equal Cost Multi-Path) routing [1] allows flow (e.g., packets with same source and destination IP addresses) or packet level load balancing, but this does not employ the concept of explicit routing.

Typically, explicit routing is a three step process. First, a topology database is maintained which identifies network topology, typically by identifying nodes and links between nodes. IGP (Internal Gateway Protocol) for example, provides such network topologies. A scalar metric or metrics is associated with each link, for example in accordance with OSPF-TE. Then, signalling is employed in the network to reserve resources between a source and a destination, for example employing the RSVP-TE (Resource ReSerVation Protocol—Traffic Engineering) protocol. After resources have been successfully reserved, label distribution is performed to set up the actual label switched paths between the source and destination.

SUMMARY OF THE INVENTION

This invention provides a novel mechanism to ensure both the improved use of network resources and adequate performance of best effort (BE) traffic by intelligently distributing the BE traffic demands at connection level with corresponding scaling weights, and without reserving bandwidth.

A weighted sum of the best effort (BE) class connections (or LSPs in MPLS context) in a link is used as a path selection criterion, where each BE connection is weighted by its service volume (for example 10 Mbps may be assigned an integer value of 10, while 10 Gbps is to 10,000).

Preferably, the traffic engineering extension of IGP (Internal Gateway Protocol) such as OSPF-TE is adapted to advertise the weighted sum of BE connections as one of the link constraints, and a CBR (Constraint Based Routing) algorithm will select a path with the lowest utilization level.

A motivation of embodiments of the invention is to ensure that even the BE class connections can get adequate level of performance by (1) incorporating usage information of BE traffic as part of the traffic engineering extension IGP such as OSPF-TE, and by (2) using such information in calculating paths for BE connections with different service volume. An improved use of network resources is also achieved.

According to one broad aspect, the invention provides a network path selection method involving maintaining a network topology model comprising a plurality of nodes and a plurality of links interconnecting the nodes, the network topology further comprising a weighted BE (best effort) connection metric for each of the plurality of links; to determine a path from a source to a destination having a requested BE service volume: creating a virtual topology in which all links have weighted BE metrics updated to include the effects of the requested BE service volume, and identifying a best path through the virtual topology taking into account the weighted BE metrics.

In one embodiment the weighted BE connection metric takes into account only BE connection service volume. In other embodiments, the weighted BE connection metric for a given link takes into account BE connection service volume on the given link, and a remaining capacity on the given link taking into account other traffic classes with bandwidth commitment.

Preferably, a fraction of each link's capacity to be made available for BE traffic is set aside.

Preferably, the weighted BE connection metrics are computed in a manner which encourages making use of at least a portion of unused bandwidth which is reserved for other traffic classes.

The path selection process may also take into account one or more of administrative costs, edge disjointness, node disjointness, and shared risk link group disjointness for protection/restoration paths.

Preferably, the weighted BE connection metric within a network is advertised as part of a modified OSPF-TE (Open Shortest Path First—Traffic Engineering) link state advertisement.

Another broad aspect of the invention provides a network component adapted to perform path selection. The component has a network topology repository identifying a network topology comprising a plurality of nodes and a plurality of links interconnecting the nodes, the network topology further comprising a weighted BE (best effort) connection metric for each of the plurality of links. There is also a network path selecting component adapted to determine a path from a source to a destination having a requested BE service volume by: a) creating a virtual topology in which all links in the network topology have weighted BE metrics updated to include the effects of the requested BE service volume; and b) identifying a best path through the virtual topology taking into account the weighted BE metrics.

Another broad aspect of the invention provides a network component comprising means for computing a weighted BE connection metric for a link and means for advertising the weighted BE connection metric within a network.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

An embodiment of the invention provides a novel mechanism to ensure both the efficient use of network resources and adequate performance of best effort (BE) traffic by intelligently distributing the BE traffic demands at connection level through the use of scaling weights which are preferably based on/factor in a computed weighted sum of BE connections.

Each BE connection has an associated service volume which may or may not be achieved since BE service volumes are not guaranteed. The BE connection's service volume can be determined for example by the user port speed or requested via the SLA (service Level Agreement) as part of the service creation process. Alternatively, the PIR (Peak Information Rate) of a BE connection can also be used as the service volume. Each link over which a BE connection is routed has an associated metric maintained consisting a weighted sum of BE connections over the link, with each BE connection being weighted by an amount proportional to the connection's service volume. More specifically, in a first preferred embodiment of the invention, for the kth link the following metric $M_k$ is maintained:

$$M_k = \Sigma w_i$$

where $\Sigma w_i$=the sum of the BE connection service volume, where $w_i$ is the service volume for the ith BE connection. In this embodiment, the link metric is simply the sum of the BE connection service volume. A link with more BE connection service volume will have a higher metric.

Figure 1:
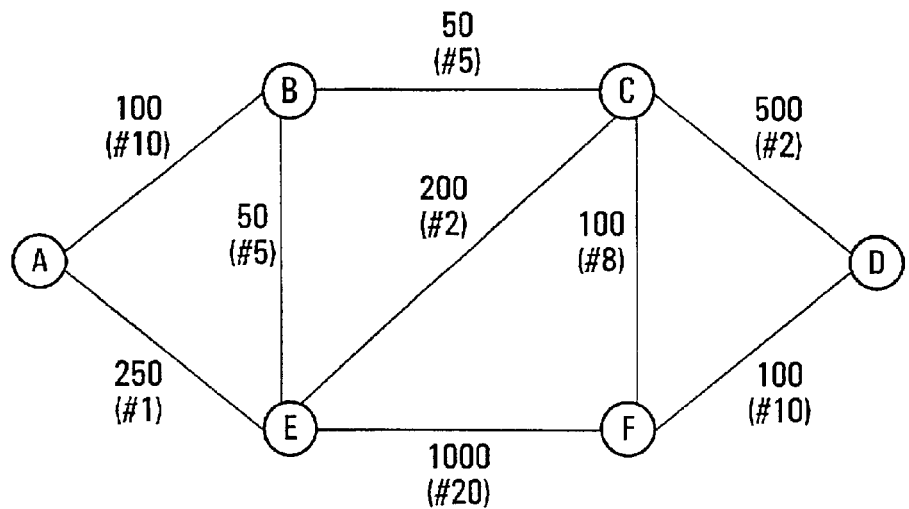
FIGS. 1, 2 and 3 are network topologies in accordance with a network path selection method provided by an embodiment of the invention.

FIG. 1 depicts an example of a network topology for the purpose of describing BE path selection based on the MN weighted sum of BE connections. In this example, there are six nodes labelled A, B, C, D, E, F with various interconnecting links. Each link interconnects two nodes, and will be referred to by the pair of nodes it interconnects. Thus in FIG. 1, the links include AB, AE, BC, BE, CD, CE, CF, FD. In this example Figure, only BE connections are supported. Each link has an associated current number of BE connections indicated in parenthesis shown for illustrative purposes only, and has a BE connection weight equal to the sum of the service volumes for these BE connections (i.e. $\Sigma w_i$). For example, link AB has 10 BE connections having a total service volume of 100.

Figure 2:
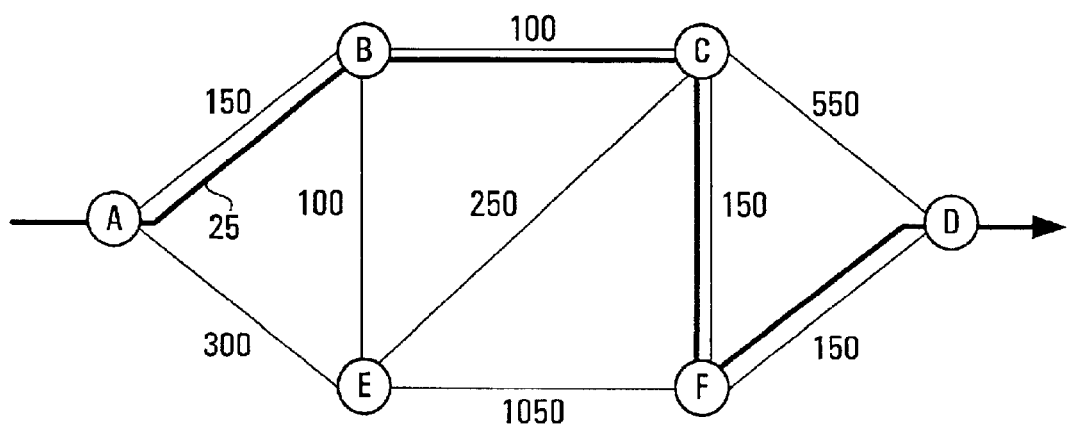

When a new request for a BE connection is made having a requested service volume, a virtual topology is created in which each link's BE connection weight is increased by the requested service volume. For a requested bandwidth of 50, the virtual topology is as shown in FIG. 2. The best path through the temporary topology is identified using a shortest path first computation such as a Dijkstra algorithm where the above metric is used as the link cost.

In addition to the weighted BE connection metric, a MCR (Multi Constraint Routing) algorithm may be used which is further adapted to consider other link constraints (such as administrative costs, edge, and/or node disjointness, shared risk link group disjointness for protection/restoration, etc) for the path selection. The non-BE bandwidth requirements also need to be considered when multiple traffic classes are to be supported via a single LSP.

Figure 3:
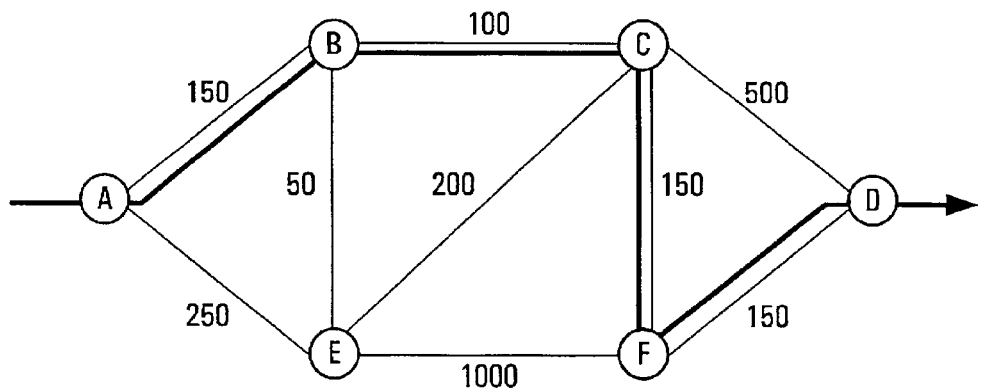

In the illustrated example, the best path 25 is identified to be links AB, BC, CF, and FD. The BE connection weights associated with the links of the best path 25 in the original topology (FIG. 1) are increased by the requested BE service volume resulting in the topology of FIG. 3 after allocation.

In another preferred embodiment of the invention, in addition to considering BE traffic load balancing, the metrics also take into account the amount of bandwidth being used for other traffic classes. For the kth link the following metric $M_k$ is maintained:

$$M_k = \Sigma w_i / X$$

where X is a quantity which is larger when the particular link has more capacity available for BE traffic, and is smaller when the particular link has less capacity available for BE traffic. For example, in a preferred embodiment, the metrics are determined according to:

$$M_k = \Sigma w_i / (\delta((1-\alpha)C - \Sigma(\text{Reserved bandwidth of non-}BE) + \alpha C) \quad (1)$$

where:

C=total capacity of link;

$\delta$=a scaling constant ($0 <= \delta <= 1$) determining the fraction of remaining unreserved bandwidth of higher priority traffic classes which is to be made available for BE traffic.

$\alpha$=fraction of total capacity C to be set aside for aggregate use by BE connections—such a practice of reserving a portion of link capacity prevents starvation of BE traffic due to higher priority class traffic;

$\Sigma$(Reserved bandwidth of non-BE)=the sum of all non-BE bandwidth reserved on the particular link;

$\Sigma w_i$=the sum of the BE connection service volumes, where $w_i$ is the service volume for the ith BE connection.

In this embodiment, the link metric is the sum of the BE connection service volumes divided by a quantity representative of available bandwidth on the link. A link with more BE connection service volume will have a higher metric. At the same time, a link with less available bandwidth will also have a higher metric. When $\delta=0$, the BE path computation only considers the available bandwidth to be link bandwidth set aside for BE and its utilization level. This is the case for the example of FIGS. 1-3 described above. On the other hand, when $\delta=1$, the path computation aggressively accounts for the total available bandwidth for the BE at the time of computation, including unutilized portions of bandwidth allocated to other service classes. Network operators can set the non-BE scaling factor, $\delta$, appropriately, for example depending on the observed characteristics of non-BE service request arrival and departure rates.

It is noted that the sum of the reservable bandwidths for non-BE traffic may be in general greater than $(1-\alpha)C$ to prevent link under-utilization to a degree. This is also termed "partial sharing". In one extreme case, the sum of the maximum reservable bandwidths is constrained not to exceed $(1-\alpha)C$. In this case, it is possible for the link to be under-utilized when any class of traffic is not using the link to its full maximum reserved bandwidth. The other extreme case is "complete sharing" in which each maximum reservable bandwidth is set to equal $(1-\alpha)C$ meaning that any one class can fully book the link capacity. Note that in both "partial" and "complete" sharing, an additional condition is required, namely that the sum of the actual reserved bandwidths for non-BE traffic be less than or equal to $(1-\alpha)C$.

A detailed example of this type of metric computation will be described in the context of the traffic classes of service defined by in [3, 4, 5], in which the link metric introduced in equation 1 is employed. The traffic classes include EF (expedited forwarding), AF-1 (assured forwarding-1), AF-2 and BE (best effort). Now as an example of link metric computation for a particular link using equation 1 above, we assume that for that link, a total capacity of C=10 Gbps, and α=0.1. We assume δ=0.5 meaning half of the unused capacity of higher traffic classes is made available to BE traffic. For this example, the maximum reservable and reserved bandwidths for the traffic classes on a given link are as follows:

EF traffic can reserve up to a=3 Gbps, 2 Gbps currently reserved;

AF1 can reserve up to b=5 Gbps; 1 Gbps reserved;

AF2 can reserve up to c=9 Gbps; 2 Gbps reserved;

BE reserved bandwidth of αC=1 Gbps; 4 Gbps total aggregate service volume carried.

In this example, the maximum reservable bandwidths for non-BE traffic is 3+5+9 which is greater than (1−α)C=9, so partial sharing is occurring.

In addition to the above constraints, the total aggregate sum of reserved bandwidth of all non-BE class traffic (e.g., EF+AF1+AF2) cannot be more than (1−α)C=9 Gbps thereby providing the reserved bandwidth αC for BE traffic. Note however that BE service volume can be greater, as all BE requests are serviced on a best effort basis. The link metric is then computed according to equation 1 as follows:

$$M_k = \Sigma w_j / (\delta((1-\alpha)C - \Sigma(\text{Reserved bandwidth of non-}BE) + \alpha C) = 4/(0.5((1-0.1)10-5) + 0.1 \times 10) = 4/3 = 1.33$$

In a preferred embodiment of the invention, the traffic engineering extension of IGP (Internal Gateway Protocol) such as OSPF-TE is adapted to use the weighted sum of BE connections as one of the link constraints, and the MCR (Multi-Constraint Routing) algorithm will select a path with the lowest utilization level. In a preferred embodiment of the invention, the weighted sum of BE connections is included as part of the OSPF-TE link state advertisement. More generally, in a preferred embodiment, the network nodes advertise the weighted sum of BE connections in any suitable manner. Preferably, all nodes in the network flood such link metrics to all others. Such advertisement may occur periodically, or as events occur such as link failures. The advertisement may be done on the basis of physical (e.g. lambda) or logical links.

Figure 4:
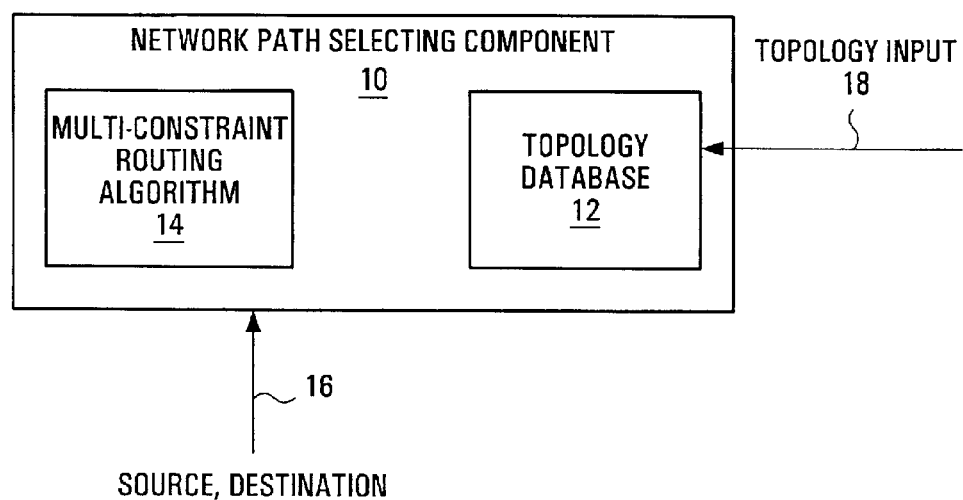
FIG. 4 is a block diagram of a network path selection component provided by an embodiment of the invention.

Path selection can be performed using these methods by any component supplied with the necessary topology information. Referring to FIG. 4, shown is a network path selecting component (NPSC) generally indicated by 10, which may part of a network node, a network management platform for example, and may be implemented using any suitable combination of hardware and/or software. The NPSC 10 has a topology database 12 of a network under consideration which forms the basis of the path selection. More generally, the topology may be maintained in any suitable topology repository. The topology database 12 includes an identification of all nodes and the interconnections between the nodes, and one or more metrics/costs/parameters associated with each link. Topology input 18 is generally representative of any and all input which might change the topology. For example, it might consist of the above referenced OSPF-TE link state advertisements which will allow the topology to update the metrics/costs/parameters associated with each link. The NPSC 10 has a routing algorithm which is preferably a multi-constraint routing algorithm 14. The NPSC 10 receives as input 16 an identification of a source and destination within the network topology database 12. The multi-constraint routing algorithm 14 identifies the best path through the network topology database 12 from the source to the destination.

Figure 5:
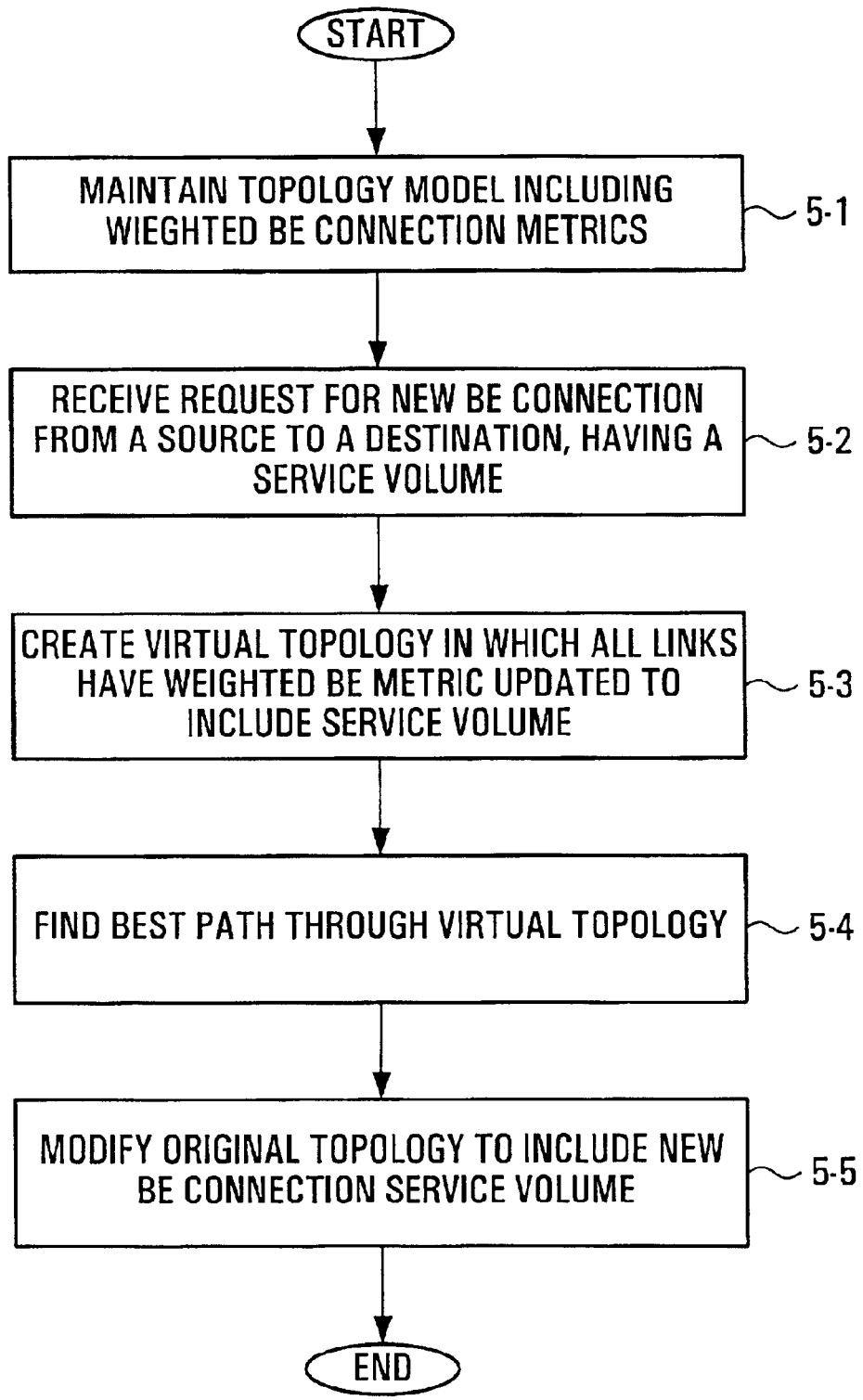
FIG. 5 is a flowchart of a network path selection method provided by an embodiment of the invention.

The functionality of the NPSC 10 is also summarized in flowchart form in FIG. 5. Step 5-1 involves maintaining the network topology database including weighted BE connection metric for each link. Step 5-2 is the receipt of a request for a new BE connection from a source to a destination, the request having a service volume. Next, a virtual topology is created in which all links have weighted BE metrics updated to include the effects of the requested service volume (step 5-3). Next, the best path through the virtual topology is identified (step 5-4). Next, the original topology is modified to include the new connection requested bandwidth (step 5-5). This next step need not explicitly be performed in the event the topology is updated in step 5-1 to include the changes at a later time. The changes may not occur until the nodes in the network generate link state advertisements which include the effects of the added BE connection.

The functionality of the NPSC may also be delivered in the form of a computer readable medium having computer readable program code means embodied therein.

Numerous modifications and variations of the present invention are possible in light of the above teachings. It is therefore to be understood that within the scope of the appended claims, the invention may be practised otherwise than as specifically described herein.

REFERENCES

[1] D. Awduche, et al "Requirements for Traffic Engineering Over MPLS," RFC 2702, September 1999.

[2] D. Awduche, et al "A Framework for Internet Traffic Engineering," Work in progress, draft-ietf-tewg-framework-03.txt, March 2001.

[3] F. L. Faucheur, et al, "Requirements for support of Diff-Serv-aware MPLS Traffic Engineering," Work in progress, draft-lefaucheur-diff-te-reqts-00.txt, July 2000.

[4] V. Jacobson, et al, "An Expedited Forwarding PHB," RFC 2598, June 1999.

[5] J. Heinanen, et al, "Assured Forwarding PHB Group," RFC 2597, June 1999.

We claim:

1. A network path selection method comprising:

maintaining a network topology repository comprising a plurality of nodes and a plurality of links interconnecting the nodes, the network topology further comprising a weighted BE (best effort) connection metric for each of the plurality of links;

to determine a path from a source to a destination having a requested BE service volume:

a) creating a virtual topology in which all links have weighted BE metrics updated to include the effects of the requested BE service volume; and b) identifying a best path through the virtual topology taking into account the weighted BE metrics;

wherein the weighted BE connection metric for a given link takes into account BE connection service volumes on the given link, and a remaining capacity on the given link taking into account other traffic classes.

2. A method according to claim 1 further comprising:

setting aside a fraction of each link's capacity to be made available for BE traffic.

3. A method according to claim 1 further comprising:

computing the weighted BE connection metrics in a manner which encourages making use of at least a portion of unused bandwidth which is reserved for other traffic classes.

4. A method according to claim 1 wherein the weighted BE connection metric for each of the plurality of links is determined according to $$M_k = \Sigma w_i$$

where $M_k$ is the metric for a kth of the plurality of links, where $\Sigma w_i$=a sum of previously requested BE connection service volumes, where $w_i$ is a service volume for the ith previously requested BE connection.

5. A method according to claim 1 wherein the weighted BE connection metric for each of the plurality of links is determined according to:

$$M_k = \Sigma w_i / X$$

where $M_k$ is the metric for a kth of the plurality of links, where $\Sigma w_i$=a sum of previously requested BE connection service volumes, where $w_i$ is a service volume bandwidth for the ith previously requested BE connection, and where X is a quantity which introduces effects of other traffic classes, with X being larger when the particular link has more capacity available for BE traffic, and X being smaller when the particular link has less capacity available for BE traffic.

6. A method according to claim 1 wherein the weighted BE connection metric for each of the plurality of links is determined according to:

$$M_k = \Sigma w_i / (\delta((1-\alpha)C - \Sigma(\text{Reserved bandwidth of non-}BE) + \alpha C)$$

where:
  $M_k$ is the metric for a kth of the plurality of links;
  $\Sigma w_i$=a sum of the previously requested BE connection service volumes, where $w_i$ is a service volume for the ith BE connection;
  C=total capacity of the link;
  δ=a scaling constant (0 <=δ<=1) determining the fraction of remaining unreserved bandwidth of higher priority traffic classes which is to be made available for BE traffic;
  α=fraction of total capacity C to be set aside for reservation by BE connections; and
  Σ(Reserved bandwidth of non-BE)=the sum of all non-BE bandwidth reserved on the link.

7. A method according to claim 1 wherein the step of identifying a best path through the virtual topology taking into account the weighted BE metrics is performed using a multi-constraint routing algorithm which also takes into account at least one of:
  administrative costs, edge disjointness, node disjointness, and shared risk link group disjointness for protection/restoration paths.

8. A network component adapted to perform path selection, the component comprising:
  a network topology repository identifying a network topology comprising a plurality of nodes and a plurality of links interconnecting the nodes, the network topology further comprising a weighted BE (best effort) connection metric for each of the plurality of links;
  a network path selecting component adapted to determine a path from a source to a destination having a requested BE service volume by:
  a) creating a virtual topology in which all links in the network topology have weighted BE metrics updated to include the effects of the requested BE service volume; and
  b) identifying a best path through the virtual topology taking into account the weighted BE metrics;
  wherein the weighted BE connection metric takes into account only BE connection service volumes.

9. A network component according to claim 8 wherein the weighted BE connection metric for a given link takes into account BE connection service volumes on the given link, and a remaining capacity on the given link taking into account other traffic classes.

10. A network component according to claim 8 wherein a fraction of each link's capacity is set aside to be made available for BE traffic.

11. A network component according to claim 8 wherein:
  the network path selecting component is adapted to compute the weighted BE connection metrics in a manner which encourages making use of at least a portion of unused bandwidth which is reserved for other traffic classes.

12. A network component according to claim 8 wherein the weighted BE connection metric for each of the plurality of links is determined according to $$M_k = \Sigma w_i$$

where $M_k$ is the metric for a kth of the plurality of links, where $\Sigma w_i$=a sum of previously requested BE connection service volumes, where $w_1$ is a service volume for the ith previously requested BE connection.

13. A network component according to claim 8 wherein the weighted BE connection metric for each of the plurality of links is determined according to:

$$M_k = \Sigma w_i / X$$

where $M_k$ is the metric for a kth of the plurality of links, where $\Sigma w_i$=a sum of previously requested BE connection service volumes, where $w_i$ is a service volume bandwidth for the ith previously requested BE connection, and where X is a quantity which introduces effects of other traffic classes, with X being larger when the particular link has more capacity available for BE traffic, and X being smaller when the particular link has less capacity available for BE traffic.

14. A network component according to claim 8 wherein the weighted BE connection metric for each of the plurality of links is determined according to:

$$M_k = \Sigma w_i / (\delta((1-\alpha)C - \Sigma(\text{Reserved bandwidth of non-}BE) + \alpha C)$$

where:
  $M_k$ is the metric for a kth of the plurality of links; $\Sigma w_i$=a sum of the previously requested BE connection service volumes, where $w_i$ is a service volume for the ith BE connection;
  C=total capacity of the link;
  δ=a scaling constant (0<=δ<=1) determining the fraction of remaining unreserved bandwidth of higher priority traffic classes which is to be made available for BE traffic;
  α=fraction of total capacity C to be set aside for reservation by BE connections; and
  Σ(Reserved bandwidth of non-BE)=the sum of all non-BE bandwidth reserved on the link.

15. A network component according to claim 8 wherein identifying a best path through the virtual topology taking into account the weighted BE metrics is performed using a multi-constraint routing algorithm which also takes into account at least one of:
  administrative costs, edge disjointness, node disjointness, and shared risk link group disjointness for protection/restoration paths.

* * * * *